United States Patent
Huang

(10) Patent No.: US 10,753,531 B2
(45) Date of Patent: Aug. 25, 2020

(54) MULTI-DISPLAY STAND

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 0 days.

(21) Appl. No.: 16/414,745

(22) Filed: May 16, 2019

(65) Prior Publication Data

US 2019/0353297 A1    Nov. 21, 2019

Related U.S. Application Data

(60) Provisional application No. 62/673,133, filed on May 18, 2018.

(51) Int. Cl.
| | | |
|---|---|---|
| F16M 11/04 | (2006.01) | |
| F16M 11/08 | (2006.01) | |
| F16M 11/24 | (2006.01) | |
| F16M 11/16 | (2006.01) | |
| F16M 11/20 | (2006.01) | |

(52) U.S. Cl.
CPC ............. *F16M 11/08* (2013.01); *F16M 11/16* (2013.01); *F16M 11/2085* (2013.01); *F16M 11/04* (2013.01); *F16M 11/045* (2013.01); *F16M 11/24* (2013.01); *F16M 2200/02* (2013.01); *F16M 2200/08* (2013.01)

(58) Field of Classification Search
CPC ........ F16M 11/08; F16M 11/04; F16M 11/16; F16M 11/24; F16M 11/2014; F16M 11/2085

See application file for complete search history.

(56) References Cited

U.S. PATENT DOCUMENTS

| | | | | |
|---|---|---|---|---|
| 1,098,077 | A * | 5/1914 | Annison | ................... E02D 5/08 405/279 |
| 3,324,930 | A * | 6/1967 | Colombo | ................ E06B 3/481 160/231.2 |
| 5,502,930 | A * | 4/1996 | Burkette | ............... E04B 2/7429 16/225 |
| D649,552 | S * | 11/2011 | Huang | ................... F16M 11/08 D14/452 |
| 8,162,268 | B1 | 4/2012 | Huang | |
| D660,308 | S * | 5/2012 | Huang | ......................... D14/452 |
| 9,746,128 | B2 * | 8/2017 | Huang | ............... F16M 11/2014 |
| 10,066,785 | B1 * | 9/2018 | Chen | ................... F16C 11/0614 |
| 2016/0281915 | A1 * | 9/2016 | Bowman | .............. F16M 11/045 |

* cited by examiner

*Primary Examiner* — Tan Le
(74) *Attorney, Agent, or Firm* — JCIPRNET

(57) ABSTRACT

A multi-display stand configured to support a plurality of displays is provided. The multi-display stand includes a standing rod, a plurality of supporting arms, and a position-limiting member. The standing rod extends along a central axis. The supporting arms are disposed on the standing rod. Each of the supporting arms supports one of the displays. The position-limiting member is disposed between the standing rod and each of the supporting arms and includes at least one first position-limiting wall, at least one second position-limiting wall, and at least one tenon. Each of the supporting arms is radially rotatable about the central axis with respect to the standing rod between a first position and a second position. When the supporting arm is at the first position, the tenon abuts against the first position-limiting wall. When the supporting arm is at the second position, the tenon abuts against the second position-limiting wall.

15 Claims, 12 Drawing Sheets

US 10,753,531 B2

MULTI-DISPLAY STAND

CROSS-REFERENCE TO RELATED APPLICATION

This application claims the priority benefit of U.S. provisional application Ser. No. 62/673,133, filed on May 18, 2018. The entirety of the above-mentioned patent application is hereby incorporated by reference herein and made a part of this specification.

BACKGROUND OF THE INVENTION

1. Field of the Invention

The invention relates to a multi-display stand, and particularly relates to a multi-display stand for supporting a plurality of displays.

2. Description of Related Art

Owing to the development of software in recent years, operating systems compatible with use of multiple displays at the same time keep emerging and become more and more popular. A stand which normally allows only one display to be mounted is less convenient when used with such operating system. For example, to adjust the included angle between displays, it is very likely that at least one of the displays, together with the stand, needs to be lifted up and then put down in order to render the desired included angle between the displays. Besides, when the user moves his/her seat and intends to adjust the displays to face him/her directly, the user needs to move one of the displays as well as the stand, move the other display as well as the stand, and then make adjustment to set the desired included angle, which causes inconvenience and is laborious.

FIG. 1 is a schematic view of a conventional multi-display stand illustrating the technology of U.S. Pat. No. 8,162,268 B1. Referring to FIG. 1, a multi-display stand 9 shown in FIG. 1 includes a base 91, a standing rod 92 vertically disposed on the base 91, two supporting arms 93 and 94 rotatable along the axis of the standing rod 92 and slidably sleeved on the standing rod 92, and two hinges 95 respectively horizontally slidably disposed on the two supporting arms 93 and 94 and provided for mounting displays.

The supporting arm 93 has a pivoting portion 931. A tenon 9311 and a slot 9312 are formed on the bottom side of the pivoting portion 931. The supporting arm 94 has a pivoting portion 941. A slot 9411 for accommodating the tenon 9311 of the pivoting portion 931 and a tenon 9412 for being placed into the slot 9312 of the pivoting portion 931 are formed on the top side of the pivoting portion 941.

With such a structure, after the user moves his/her seats, he/she no longer needs to move each of the displays, but only needs to rotate the supporting arms 93 and 94 on the standing rod 92 to make the displays face him/her. Besides, after the heights of the supporting arms 93 and 94 are adjusted to engage the tenons 9311 and 9412 into the slots 9312 and 9411, the fitting between the tenons 9311 and 9412 and the slots 9312 and 9411 can limit the angle at which the supporting arms 93 and 94 rotate along the standing rod to prevent the multi-display stand 9 from toppling over.

However, when the supporting arms 93 and 94 are at different heights, the tenons 9311 and 9412 are unable to be effectively engaged into the slots 9312 and 9411. At this time, if the user excessively rotates the supporting arms 93 and 94, the multi-display stand 9 may be easily out of balance and topple over.

SUMMARY OF THE INVENTION

The invention provides a multi-display stand, in which the angles at which the user rotates the supporting arms can be effectively limited to prevent the multi-display stand from being out of balance and toppling over.

A multi-display stand according to an embodiment of the invention is configured to support a plurality of displays. The multi-display stand includes a standing rod, a plurality of supporting arms, and a position-limiting member. The standing rod extends along a central axis. The supporting arms are disposed on the standing rod. Each of the supporting arms supports one of the displays. The position-limiting member is disposed between the standing rod and each of the supporting arms and includes at least one first position-limiting wall, at least one second position-limiting wall, and at least one tenon. Each of the supporting arms is radially rotatable about the central axis with respect to the standing rod between a first position and a second position. When the supporting arm is at the first position, the tenon abuts against the first position-limiting wall. When the supporting arm is at the second position, the tenon abuts against the second position-limiting wall.

According to an embodiment of the invention, a first reference line connecting between a first point on the first position-limiting wall and a reference point on the central axis and a second reference line connecting between a second point on the second position-limiting wall define a first angle in a radial direction with respect to the central axis. A third reference line connecting between a third point on the tenon and the reference point on the central axis and a fourth reference line connecting between a fourth point on the tenon and the reference point on the central axis define a second angle in the radial direction with respect to the central axis. The third point contacts the first point while the supporting arm is at the first position and the fourth point contacts the second point while the supporting arm is at the second position. A maximum operation angle range for rotation of each of the supporting arms along the radial direction between the first position and the second position is a difference between a value of the first angle and a value of the second angle.

According to an embodiment of the invention, each of the supporting arms includes a surrounding body, the surrounding body is substantially tube-like and has a gap to form a C-shaped cross-section.

According to an embodiment of the invention, the standing rod further includes a rod body and a plurality of hollow bushings. The hollow bushings are sleeved on the rod body. Each of the surrounding bodies is sleeved on one of the hollow bushings correspondingly. Each of the hollow bushings has a cutout for the tenon to pass through, thereby forming the C-shaped cross-section.

According to an embodiment of the invention, the corresponding first position-limiting wall and second position-limiting wall define a slot. The slot is in communication with the cutout. The tenon passes through the cutout and is partly accommodated in the slot.

According to an embodiment of the invention, the slot and the cutout extend parallelly relative to the central axis.

According to an embodiment of the invention, each of the supporting arms further includes a clamping member disposed through the surrounding body. The clamping member adjusts sizes of the gap and the cutout to modify an extent of clamping of the surrounding body and the hollow bushing with respect to the standing rod.

According to an embodiment of the invention, each of the supporting arms includes an arm body and a hinge. The arm body is connected to the surrounding body and extends outward. The hinge is disposed on the arm body and provided for mounting the display.

According to an embodiment of the invention, the maximum operation angle is between 20° and 40°.

According to an embodiment of the invention, the multi-display stand further includes a base. The standing rod is disposed on the base.

According to an embodiment of the invention, the first position-limiting wall and the second position-limiting wall are disposed on the standing rod. The tenon is disposed on the supporting arm.

According to an embodiment of the invention, the tenon is disposed on the standing rod, and the first position-limiting wall and the second position-limiting wall are disposed on the supporting arm.

According to an embodiment of the invention, the number of the supporting arms is two. The surrounding body of one of the supporting arms and the surrounding body of the other of the supporting arms are in complementary shapes. The first position-limiting wall and the second position-limiting wall are disposed on the standing rod. The tenon is disposed on an inner surface of the surrounding body.

According to an embodiment of the invention, the number of the supporting arms is two, and the surrounding body of one of the supporting arms and the surrounding body of the other of the supporting arms are in complementary shapes. The tenon is disposed on the standing rod. The first position-limiting wall and the second position-limiting wall are disposed on an inner surface of the surrounding body.

According to an embodiment of the invention, one of the supporting arms has a first surrounding body that surrounds and is fastened releasably on the standing rod, and that has a lower surface, and a first arm body that extends horizontally from the first surrounding body, that is adapted for supporting a first display thereon, and that has a lower surface, the lower surface of the first arm body being lower than the lower surface of the first surrounding body and cooperating with the lower surface of the first surrounding body to define a first vertical surface therebetween, the first vertical surface cooperating with the lower surface of the first surrounding body to define a first space therebetween. Another of the supporting arms has a second surrounding body that surrounds and is fastened releasably on the standing rod, and that has an upper surface, and a second arm body that extends horizontally from the second surrounding body, that is adapted for supporting a second display thereon, and that has an upper surface, the upper surface of the second arm body being higher than the upper surface of the second surrounding body and cooperating with the upper surface of the second surrounding body to define a second vertical surface therebetween, the second vertical surface cooperating with the upper surface of the second surrounding body to define a second space therebetween. When the first surrounding body of the first supporting arm engages the second space of the second supporting arm and the second surrounding body of the second supporting arm abuts against the first surrounding body of the first supporting arm, the second surrounding body of the second supporting arm engages the first space of the first supporting arm.

According to an embodiment of the invention, the first vertical surface has a height equal to that of the second surrounding body, and the second vertical surface has a height equal to that of the first surrounding body.

Based on the above, in the multi-display stand according to the embodiments of the invention, each of the supporting arms is radially rotatable about the central axis with respect to the standing rod between the first position and the second position. When the supporting arm is at the first position, the tenon abuts against the first position-limiting wall. When the supporting arm is at the second position, the tenon abuts against the second position-limiting wall. Accordingly, the angles at which the user rotates the supporting arms can be effectively limited to prevent the multi-display stand from being out of balance and toppling over.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
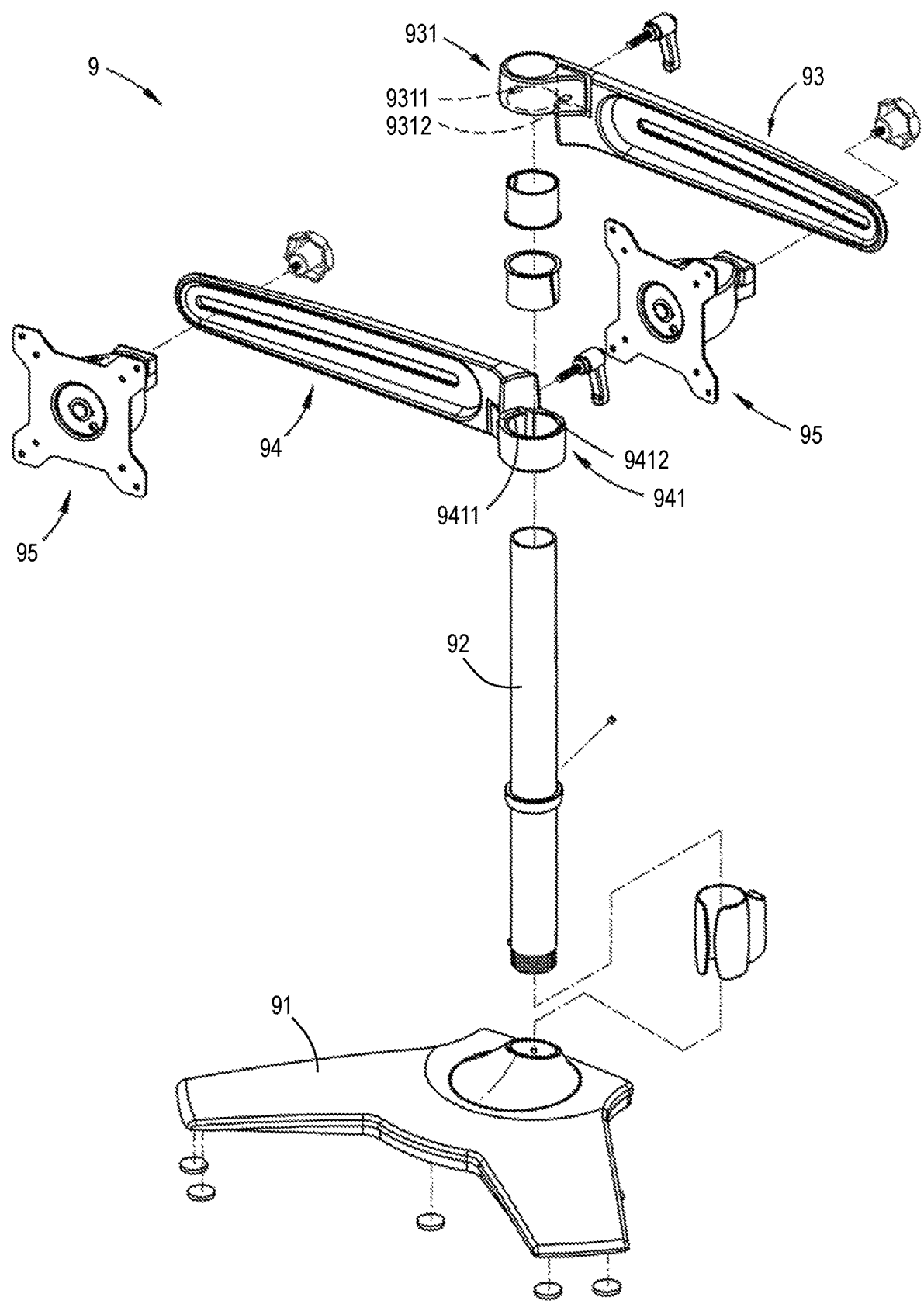
FIG. 1 is a schematic view of a conventional multi-display stand.

Reference will now be made in detail to the present preferred embodiments of the invention, examples of which are illustrated in the accompanying drawings. Wherever possible, the same reference numbers are used in the drawings and the description to refer to the same or like parts.

Figure 2:
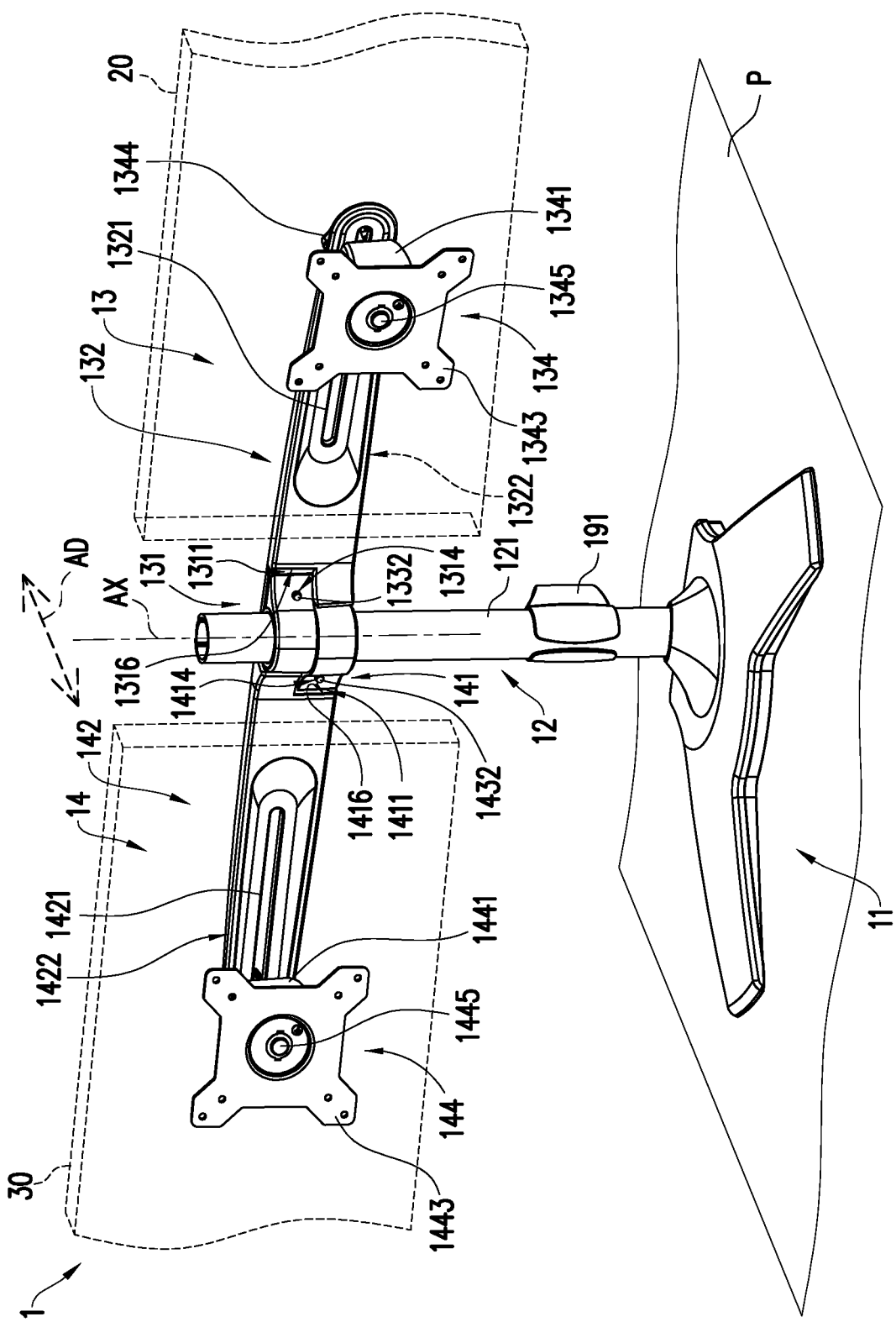
FIG. 2 is a schematic perspective view of a multi-display stand to which a first display and a second display are assembled according to an embodiment of the invention.
Figure 3:
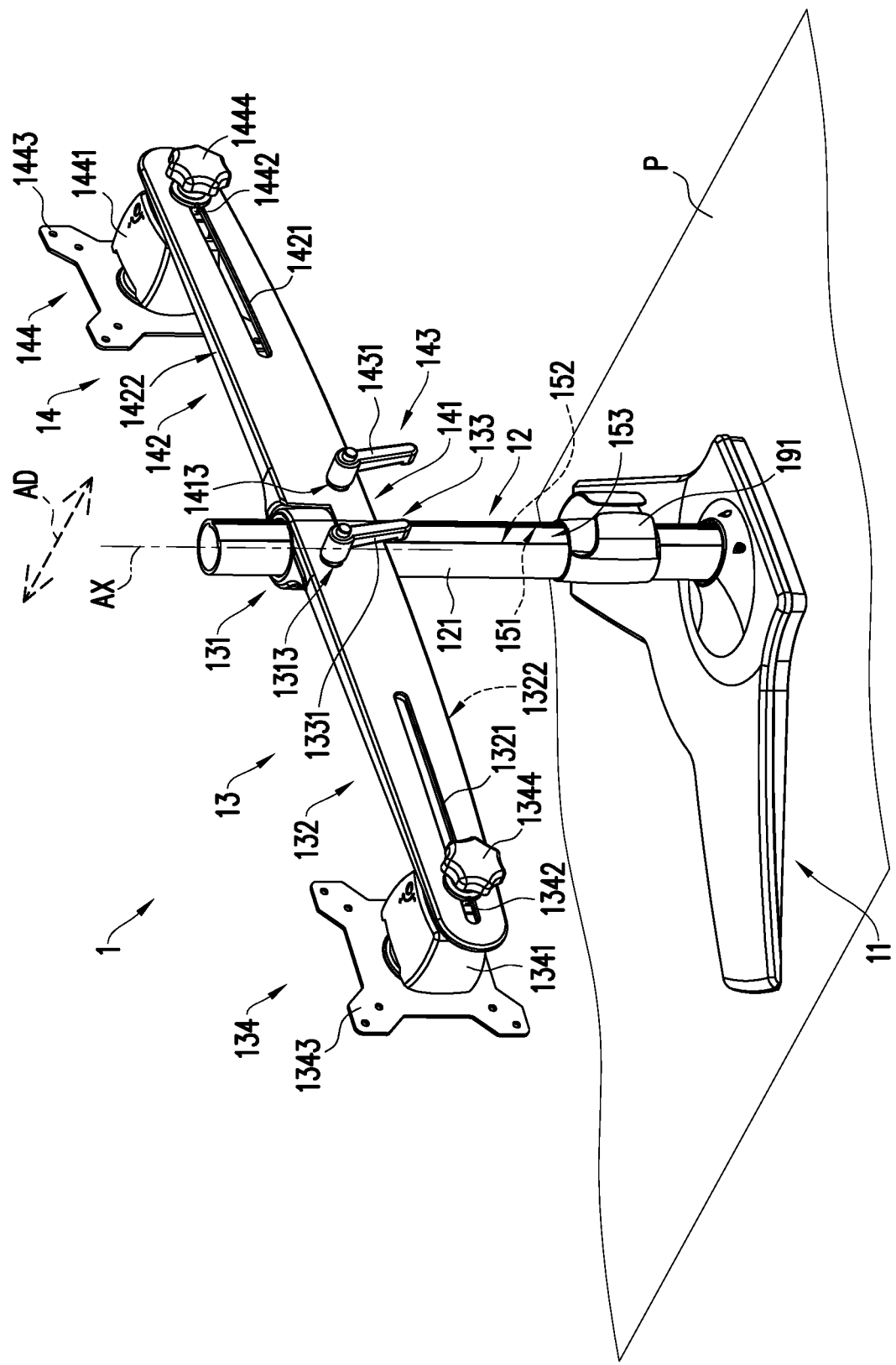
FIG. 3 is a schematic perspective view of the multi-display stand of FIG. 2 from another perspective.
Figure 4:
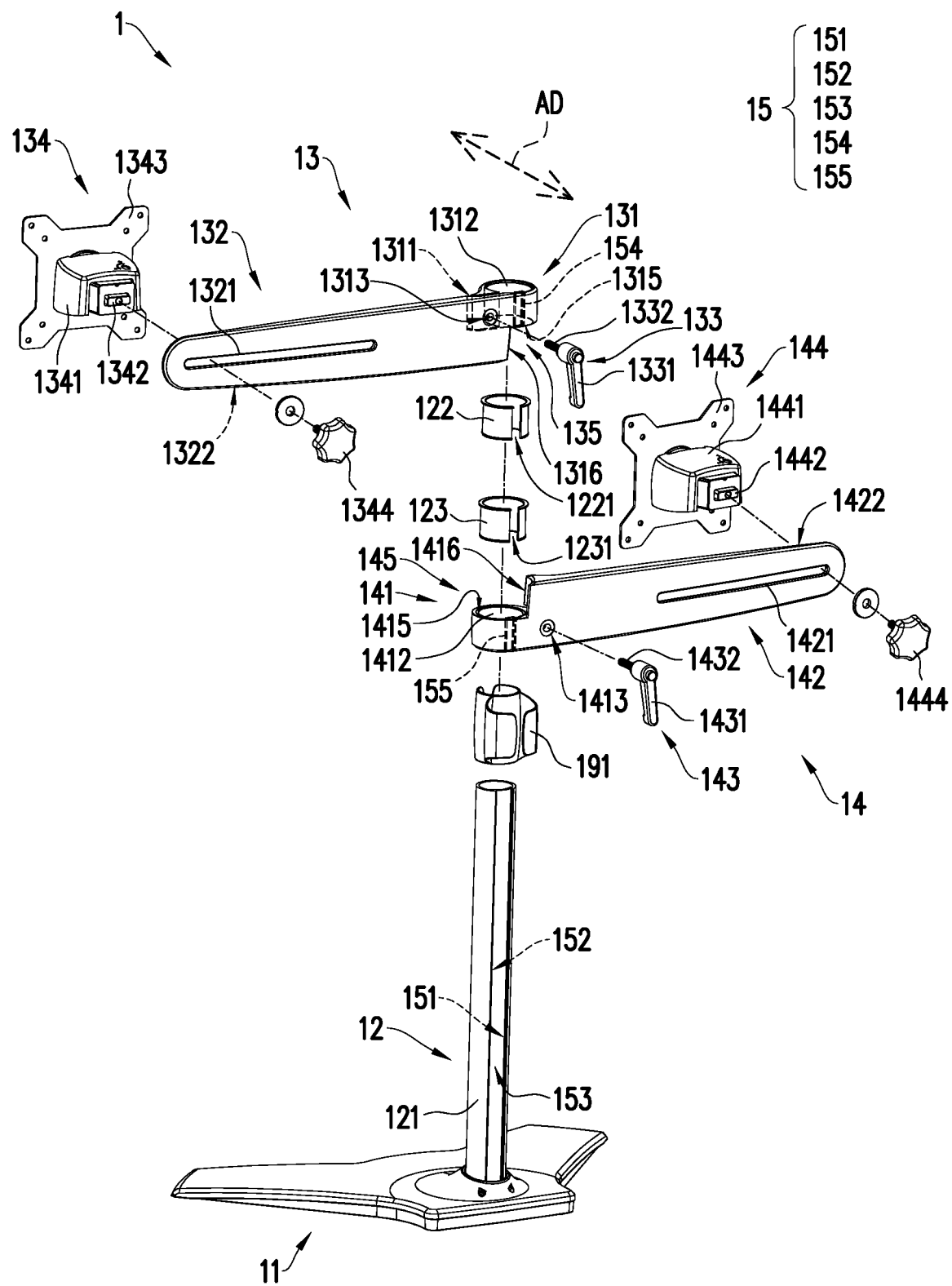
FIG. 4 is a schematic exploded view of the multi-display stand of FIG. 2.

FIG. 2 is a schematic perspective view of a multi-display stand to which a first display and a second display are assembled according to an embodiment of the invention. FIG. 3 is a schematic perspective view of the multi-display stand of FIG. 2 from another perspective. FIG. 4 is a schematic exploded view of the multi-display stand of FIG. 2. For the ease and clarity of illustration, a display 20 and a display 30 are schematically shown in dotted lines in FIG. 2, and some components that are shielded are shown in dotted lines in FIG. 4.

Referring to FIGS. 2, 3, and 4, a multi-display stand 1 of the embodiment includes a base 11, a standing rod 12, a first supporting arm 13, a second supporting arm 14, and a position-limiting member 15.

Specifically, the standing rod 12 is disposed above the base 11. The base 11 is disposed on, for example, a working plane P on the desktop. The standing rod 12 extends along a central axis AX (i.e., the central axis AX passes through the center of the standing rod 12), and defines a radial direction AD perpendicular to the central axis AX. The first supporting arm 13 and the second supporting arm 14 are connected to the standing rod 12 and movable with respect to the central axis AX and the radial direction AD. The first supporting arm 13 and the second supporting arm 14 respectively support displays, i.e., a first display 20 and a second display 30. The position-limiting member 15 is disposed between the standing rod 12 and the first supporting arm 13 and between the standing rod 12 and the second supporting arm 14, and is configured to limit the angles at which the first supporting arm 13 and the second supporting arm 14 rotate along the radial direction AD.

With the configuration, the angles at which the user rotates the first supporting arm 13 and the second supporting arm can be effectively limited to prevent the multi-display stand 1 from being out of balance and toppling over.

In the embodiment, there is no specific limitation on the numbers of the supporting arms and the displays. For example, the numbers of the supporting arms and the displays may respectively be four or six.

In other embodiments not shown herein, the position at which the standing rod is disposed is not particularly limited. For example, the standing rod may be disposed on a wall surface or be directly inserted into a desk/table.

Figure 5:
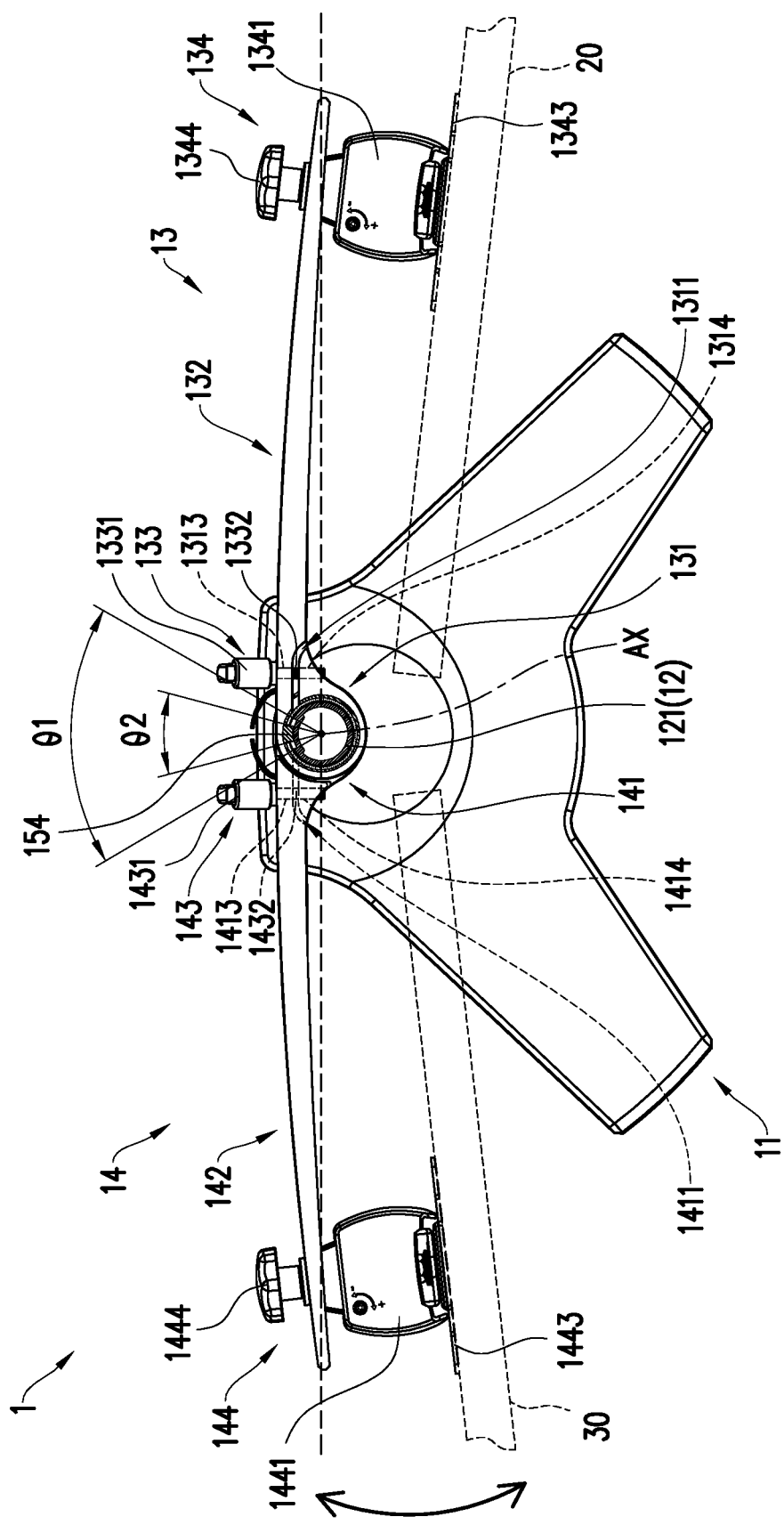
FIG. 5 is a schematic top view of the multi-display stand of FIG. 2.
Figure 6:
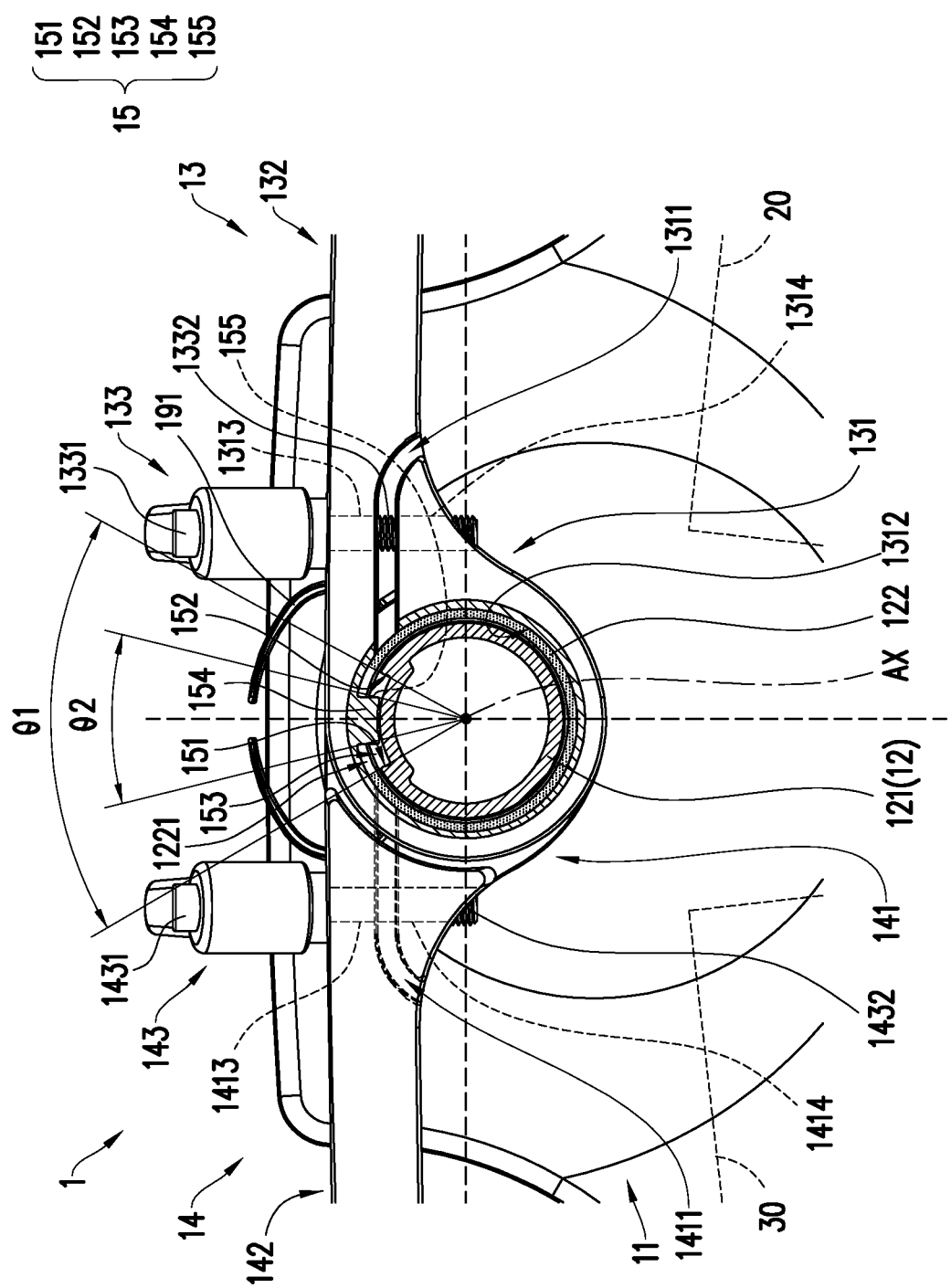
FIG. 6 is a schematic partial enlarged view of the multi-display stand of FIG. 5.

FIG. 5 is a schematic top view of the multi-display stand of FIG. 2. FIG. 6 is a schematic partial enlarged view of the multi-display stand of FIG. 5. For the ease and clarity of illustration, the display 20 and the display 30 are schematically shown in dotted lines in FIGS. 5 and 6, and some components that are shielded are shown in dotted lines.

Referring to FIGS. 4, 5, and 6, the position-limiting member 15 includes a first position-limiting wall 151, a second position-limiting wall 152, a slot 153, a first tenon 154, and a second tenon 155.

Specifically, the first position-limiting wall 151 and the second position-limiting wall 152 are disposed on the standing rod 12 and jointly define the slot 153. The first tenon 154 is disposed on the first supporting arm 13, and the second tenon 155 is disposed on the second supporting arm 14. The first tenon 154 and the second tenon 155 are respectively partly accommodated in the slot 153 and movable along the central axis AX and the radial direction AD, so that the first supporting arm 13 and the second supporting arm 14 are horizontally pivotally rotatable along the radial direction AD and reciprocally movable along the central axis AX. Accordingly, the first display 20 and the second display 30 are horizontally pivotally rotatable with the radial direction AD as center, thereby adjusting the horizontal view angle, and the height positions of the first display 20 and the second display 30 are adjustable along the central axis AX, thereby making the multi-display stand 1 convenient to use.

Referring to FIGS. 2, 3, and 4, the standing rod 12 includes a rod body 121, a first hollow bushing 122, and a second hollow bushing 123. On the rod body 121, the first position-limiting wall 151 and the second position-limiting wall 152 are formed along the central axis AX and define the slot 153. The first hollow bushing 122 and the second hollow bushing 123 are substantially tube-like, and are sleeved on the rod body 121.

More specifically, the first hollow bushing 122 has a first cutout 1221. The second hollow bushing 123 has a second cutout 1231. The first cutout 1221 and the second cutout 1231 extend along the central axis AX. In other words, the first hollow bushing 122 and the second hollow bushing 123 both have C-shaped cross-sections, thereby changing the extent of clamping the rod body 121.

Referring to FIGS. 2, 3, and 4, the first supporting arm 13 includes a first surrounding body 131, a first arm body 132, and a first clamping member 133. The first surrounding body 131 is substantially tube-like, and is sleeved outside the first hollow bushing 122 of the standing rod 12.

More specifically, the first surrounding body 131 is provided with a first gap 1311, and therefore also has a C-shaped cross-section. In this way, the extent of clamping the first hollow bushing 122 can be adjusted. The first tenon 154 is formed on a first inner surface 1312 of the first surrounding body 131. The first cutout 1221 is in communication with the slot 153. The first tenon 154 may be partly accommodated in the slot 153 through the first cutout 1221.

Besides, the first surrounding body 131 has a corresponding first through-hole 1313 and a first clamping hole 1314. The first clamping hole 1314 has an internal thread. The first arm body 132 is connected with the first surrounding body 131 and extends outward. The first clamping member 133 has a first handle 1331 and a first rod body 1332. The first rod body 1332 is formed with an external thread. The first clamping member 133 sequentially passes through the first hole 1313, the first gap 1311, and the first clamping hole 1314. As the first clamping member 133 is gradually being locked into the first clamping hole 1314, the size of the first gap 1311 is gradually decreased, so that the first supporting arm 13 can be packed to the standing rod 12 and is no longer movable along the central axis AX or the radial direction AD. When the first supporting arm 13 needs to be adjusted to move along the central axis AX or the radial direction AD, the first clamping member 133 may be loosened for making the adjustment.

Similarly, the second supporting arm 14 includes a second surrounding body 141, a second arm body 142, and a second clamping member 143. The second surrounding body 141 is substantially tube-like, and is sleeved outside the second hollow bushing 123 of the standing rod 12.

More specifically, the second surrounding body 141 is provided with a second gap 1411, and therefore also has a C-shaped cross-section. In this way, the extent of clamping the second hollow bushing 123 can be adjusted. The second tenon 155 is formed on a second inner surface 1412 of the second surrounding body 141. The second cutout 1231 is in communication with the slot 153. The second tenon 155 may be partly accommodated in the slot 153 through the second cutout 1231.

Besides, the second surrounding body 141 has a corresponding second through-hole 1413 and a second clamping hole 1414. The second clamping hole 1414 has an internal thread. The second arm body 142 is connected with the second surrounding body 141 and extends outward. The second clamping member 143 has a second handle 1431 and a second rod body 1432. The second rod body 1432 is formed with an external thread. The second clamping member 143 sequentially passes through the second hole 1413, the second gap 1411, and the second clamping hole 1414. As the second clamping member 143 is gradually being locked into the second clamping hole 1414, the size of the second gap 1411 is gradually decreased, so that the second supporting arm 14 can be packed to the standing rod 12 and is no longer movable along the central axis AX or the radial direction AD. When the second supporting arm 14 needs to be adjusted to move along the central axis AX or the radial direction AD, the second clamping member 143 may be loosened for making the adjustment.

In the embodiment, the materials of the first hollow bushing 122 and the second hollow bushing 123 may include a polyoxymethylene (POM) material. However, the invention is not limited thereto, as long as the material can prevent the first supporting arm 13 and the second supporting arm 14 from inappropriately rubbing against or causing noise with the standing rod 12. Similarly, disposing the first hollow bushing 122 and the second hollow bushing 123 may also prevent the first supporting arm 13 and the second supporting arm 14 from contacting each other, so as to prevent inappropriate friction or noise from happening.

Referring to FIGS. 2, 3, and 4, the first surrounding body 131 of the first supporting arm 13 and the second surrounding body 141 of the second supporting arm 14 are in complementary shapes.

Specifically, the first surrounding body 131 has a lower surface 1315, and the first arm body 132 has a lower surface 1322, the lower surface 1322 of the first arm body 132 being lower than the lower surface 1315 of the first surrounding body 131 and cooperating with the lower surface 1315 of the first surrounding body 131 to define a first vertical surface 1316 therebetween. The first vertical surface 1316 cooperates with the lower surface 1315 of the first surrounding body 131 to define a first space 135 therebetween. The first vertical surface 1316 has a height equal to that of the second surrounding body 141.

Meanwhile, the second surrounding body 141 has an upper surface 1415, and the second arm body 142 has an upper surface 1422, the upper surface 1422 of the second arm body 142 being higher than the upper surface 1415 of the second surrounding body 141 and cooperating with the upper surface 1415 of the second surrounding body 141 to define a second vertical surface 1416 therebetween. The second vertical surface 1416 cooperates with the upper surface 1415 of the second surrounding body 141 to define a second space 145 therebetween. The second vertical surface 1416 has a height equal to that of the first surrounding body 131.

Therefore, when the first surrounding body 131 of the first supporting arm 13 engages the second space 145 of the second supporting arm 14 and the second surrounding body 141 of the second supporting arm 14 abuts against the first surrounding body 131 of the first supporting arm 13, the second surrounding body 141 of the second supporting arm 14 engages the first space 135 of the first supporting arm 13.

With the structure, when the lower surface 1315 of the first surrounding body 131 does not contact the upper surface 1415 of the second surrounding body 141, the first surrounding body 131 is not bonded to the second space 145, and the second surrounding body 141 is not bonded to the first space 135, the position-limiting member 15 still can limit the angles at which the user rotates the first supporting arm 13 and the second supporting arm 14, thereby preventing the multi-display stand 1 from being out of balance and toppling over due to an inappropriate operation of the user.

Referring to FIGS. 2, 3, and 4, the first supporting arm 13 further includes a first hinge 134 slidably disposed in the first arm body 132. A first perforated groove 1321 is laterally disposed in the first arm body 132. A first locking end 1342 of the first hinge 134 is slidably disposed in the first perforated groove 1321, so that the first hinge 134 is laterally and reciprocally slidable with respect to the first arm body 132.

Specifically, the first hinge 134 has a first body 1341, the first locking end 1342, a first fixing plate 1343, a first fastener 1344, and a first pivot 1345. The first fastener 1344 is fastened to the first locking end 1342. The first fastener 1344 and the first body 1341 are located on two opposite sides of the first supporting arm 13. The first fastener 1344 and the first body 1341 may be optionally packed to the first supporting arm 13 and not movable. When the horizontal position of the first hinge 134 needs to be adjusted, the first fastener 1344 may be loosened for making the adjustment.

Besides, the first pivot 1345 is disposed on the first body 1341. The first fixing plate 1343 (i.e., a VESA plate) is pivotally disposed on the first pivot 1345. The first display 20 is further disposed on the first fixing plate 1343. Accordingly, the first display 20 may be pivotally rotatable through the first pivot 1345, and the first display 20 may be horizontally slidable along the first arm body 132 through the first hinge 134.

Similarly, the second supporting arm 14 further includes a second hinge 144 slidably disposed in the second arm body 142. A second perforated groove 1421 is laterally disposed in the second arm body 142. A second locking end 1442 of the second hinge 144 is slidably disposed in the second perforated groove 1421, so that the second hinge 144 may be laterally and reciprocally slidable with respect to the second arm body 142.

Specifically, the second hinge 144 has a second body 1441, the second locking end 1442, a second fixing plate 1443, a second fastener 1444, and a second pivot 1445. The second fastener 1444 is fastened to the second locking end 1442. The second fastener 1444 and the second body 1441 are located on two opposite sides of the second supporting arm 14. The second fastener 1444 and the second body 1441 may be optionally packed to the second supporting arm 14 and not movable. When the horizontal position of the second hinge 144 needs to be adjusted, the second fastener 1444 may be loosened for making the adjustment.

Besides, the second pivot 1445 is disposed on the second body 1441. The second fixing plate 1443 is pivotally disposed on the second pivot 1445. The second display 30 is further disposed on the second fixing plate 1443. In other words, the second display 30 may be rotatably disposed on the second body 1441 through the second fixing plate 1443, and the second display 30 may be horizontally slidable along the second arm body 142 through the second hinge 144.

In the embodiment, a cable manager 191 may be detachably assembled to the standing rod 12. Wires (not shown) of the first display 20 and the second display 30 may be fixed by the cable manager 191.

Figure 7:
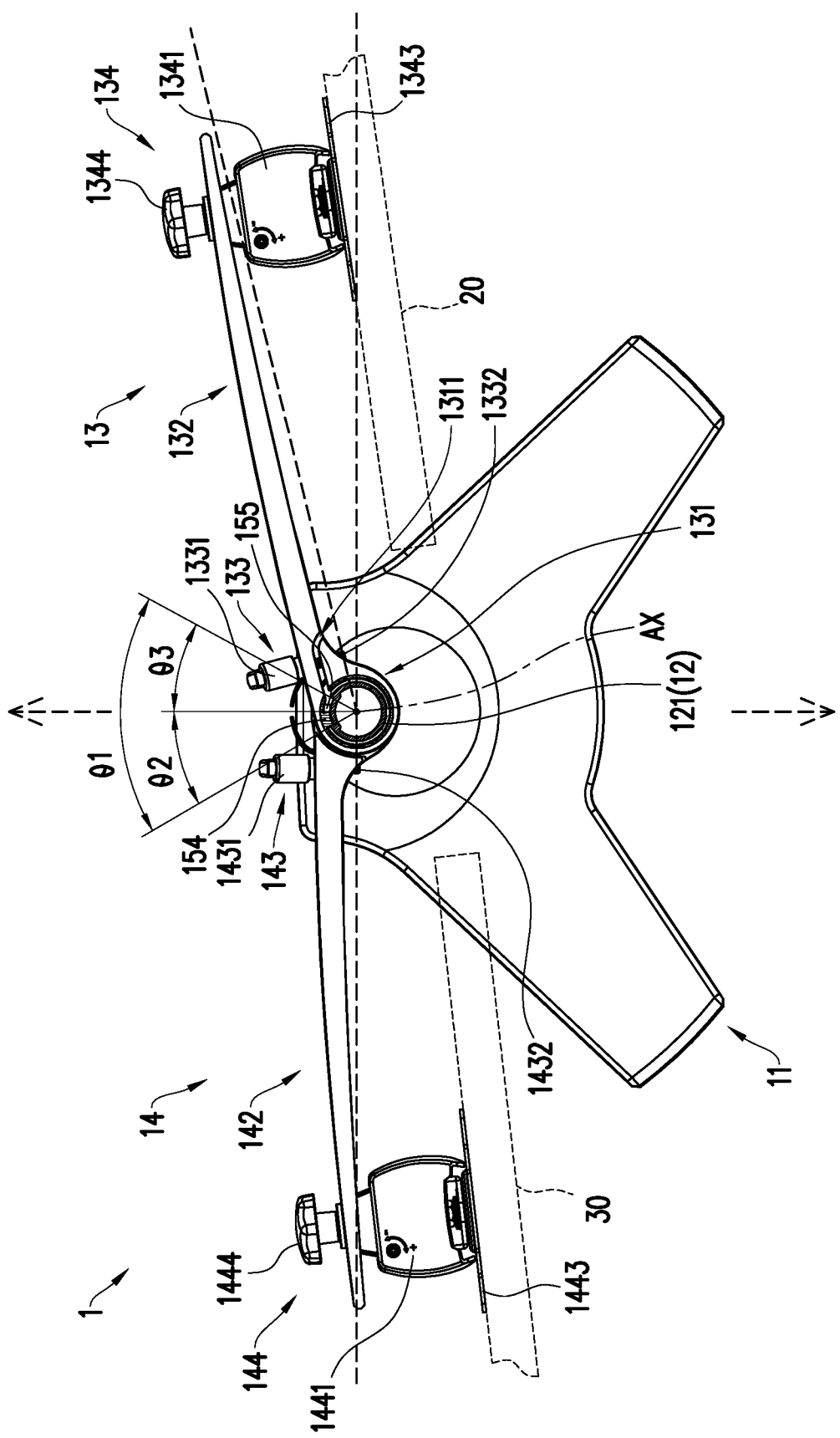
FIG. 7 is a schematic view after a first supporting arm of FIG. 5 is pivotally rotated in a first direction.
Figure 8:
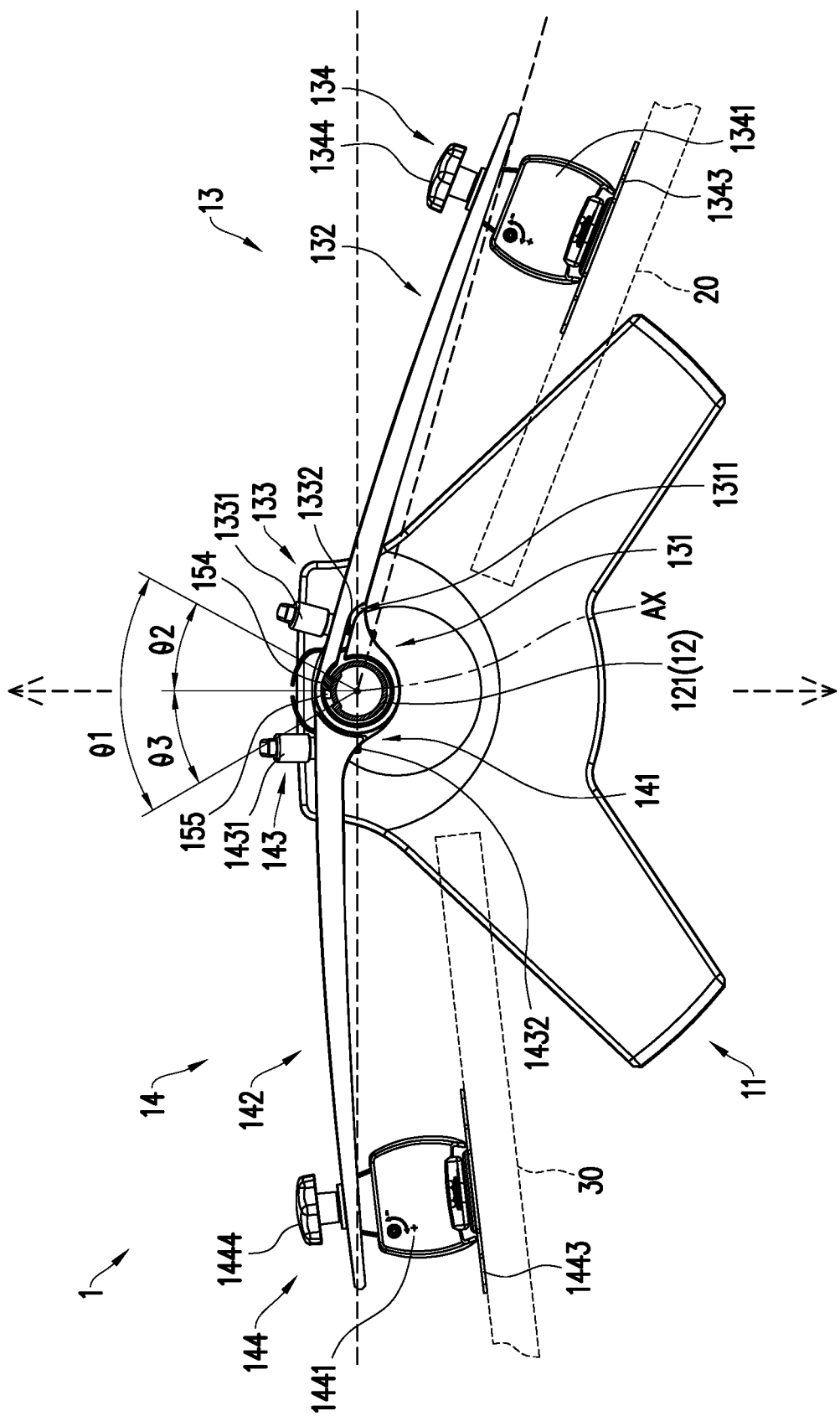
FIG. 8 is a schematic view after the first supporting arm of FIG. 5 is pivotally rotated in a second direction.

FIG. 7 is a schematic view after the first supporting arm of FIG. 5 is pivotally rotated in a first direction (rotated backward horizontally). FIG. 8 is a schematic view after the first supporting arm of FIG. 5 is pivotally rotated in a second direction (rotated forward horizontally). FIG. 7 shows an extremity, which is defined as a first position, of the pivotal rotation (backward horizontal rotation) of the first supporting arm 13 with respect to the standing rod 12 in the first direction along the radial direction AD in the embodiment. FIG. 8 shows an extremity, which is defined as a second position, of the pivotal rotation (forward horizontal rotation)

of the first supporting arm 13 with respect to the standing rod 12 in the second direction along the radial direction AD in the embodiment.

Referring to FIGS. 2, 4, 5, and 6, in the embodiment, a first angle θ1 is defined from the first position-limiting wall 151 to the central axis AX and from the second position-limiting wall 152 to the central axis AX along the radial direction AD. The first central axis θ1 is approximately between 40° and 60°.

In addition, a second angle θ2 is defined between two side edges of the first tenon 154 along the radial direction AD with respect to the central axis AX with the central axis AX as the center. The second central axis θ2 is approximately between 15° and 30°.

Here, it is defined that the rotation of the first supporting arm 13 along the radial direction AD between the first position and the second position has a maximum operation angle θ3, and the maximum operation angle θ3 is derived by subtracting the second angle θ2 from the first angle θ1. In general, the maximum operation angle θ3 is approximately between 20° and 40°. However, the invention is not limited thereto.

In other words, a first reference line connecting between a first point on the first position-limiting wall 151 and a reference point on the central axis AX and a second reference line connecting between a second point on the second position-limiting wall 152 and the reference point on the central axis AX define the first angle θ1 in the radial direction AD with respect to the central axis AX. A third reference line connecting between a third point on the first tenon 154 and the reference point on the central axis AX and a fourth reference line connecting between a fourth point on the first tenon 154 and the reference point on the central axis AX define the second angle θ2 in the radial direction AD with respect to the central axis AX. The third point contacts the first point while the first supporting arm 13 is at the first position and the fourth point contacts the second point while the first supporting arm 13 is at the second position. A maximum operation angle θ3 range for rotation of the first supporting arm 13 along the radial direction AD between the first position and the second position is a difference between a value of the first angle θ1 and a value of the second angle θ2.

When the first supporting arm 13 is moved toward the first direction as shown in FIG. 7, and the first tenon 154 abuts against the first position-limiting wall 151, the first supporting arm 13 is limited at the first position, and the first supporting arm 13 is rotated the maximum operation angle θ3.

When the first supporting arm 13 is moved toward the second direction as shown in FIG. 8, and the first tenon 154 abuts against the second position-limiting wall 152, the first supporting arm 13 is limited at the second position, and the first supporting arm 13 is rotated the maximum operation angle θ3.

Also, the operation mechanism of the second supporting arm 14 is the same as the operation mechanism of the first supporting arm 13. Therefore, details in this regard will not be repeated in the following.

With the configuration, the multi-display stand 1 of the embodiment is prevented from toppling over when the first supporting arm 13 and the first display 20 and/or the second supporting arm 14 and the second display 30 are pivotally rotated an inappropriate angle.

Figure 9:
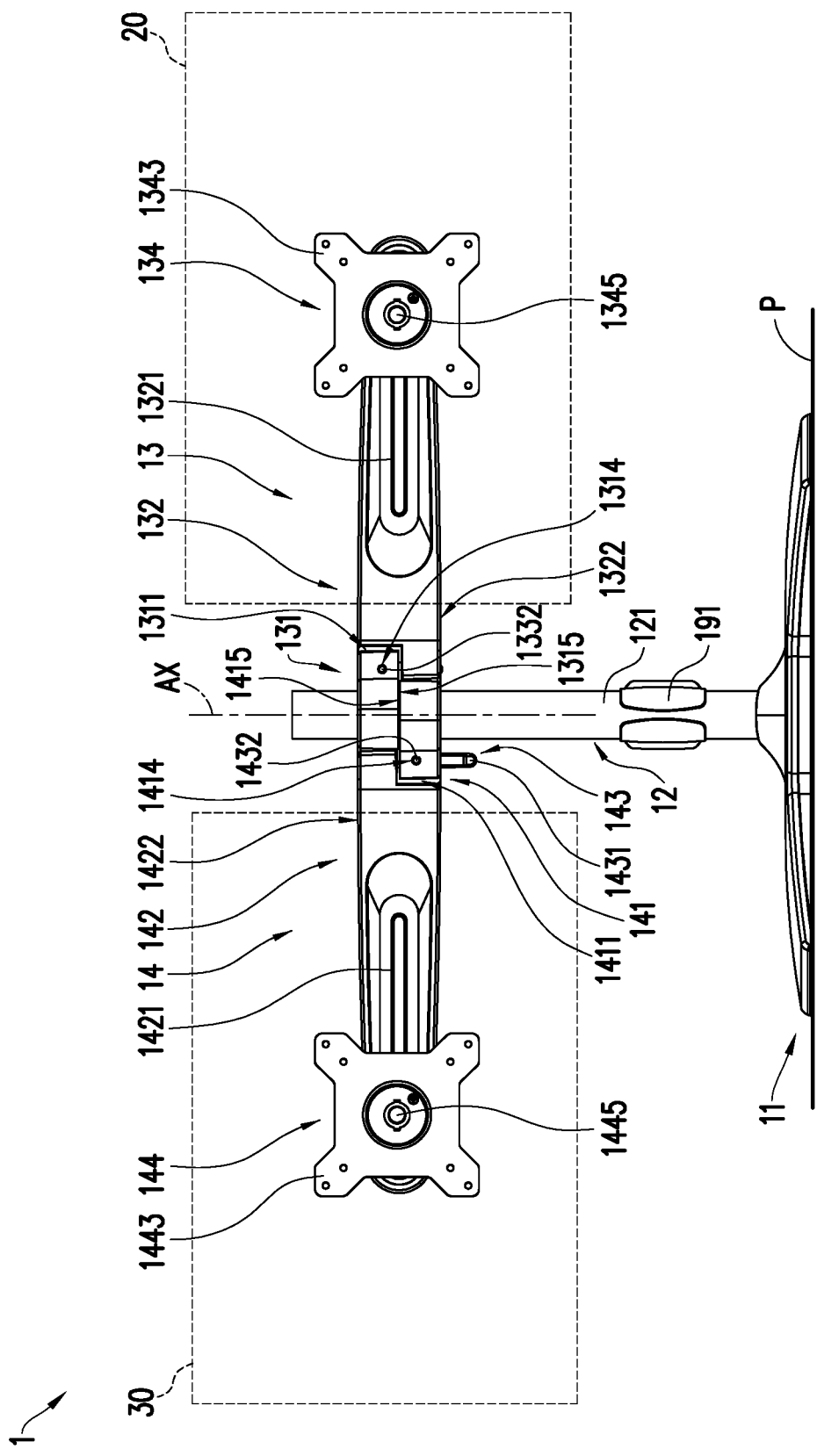
FIG. 9 is a schematic front view of the multi-display stand of FIG. 2 to which the first display and the second display are assembled.

FIG. 9 is a schematic front view of the multi-display stand of FIG. 2 to which the first display and the second display are assembled. Referring to FIGS. 3, 4, and 9, the long sides of the first display 20 and the second display 30 may be arranged horizontally. At this time, the first supporting arm 13 and the second supporting arm 14 are at the same height, and the first hinge 134 and the second hinge 144 are relatively away from the standing rod 12.

Figure 10:
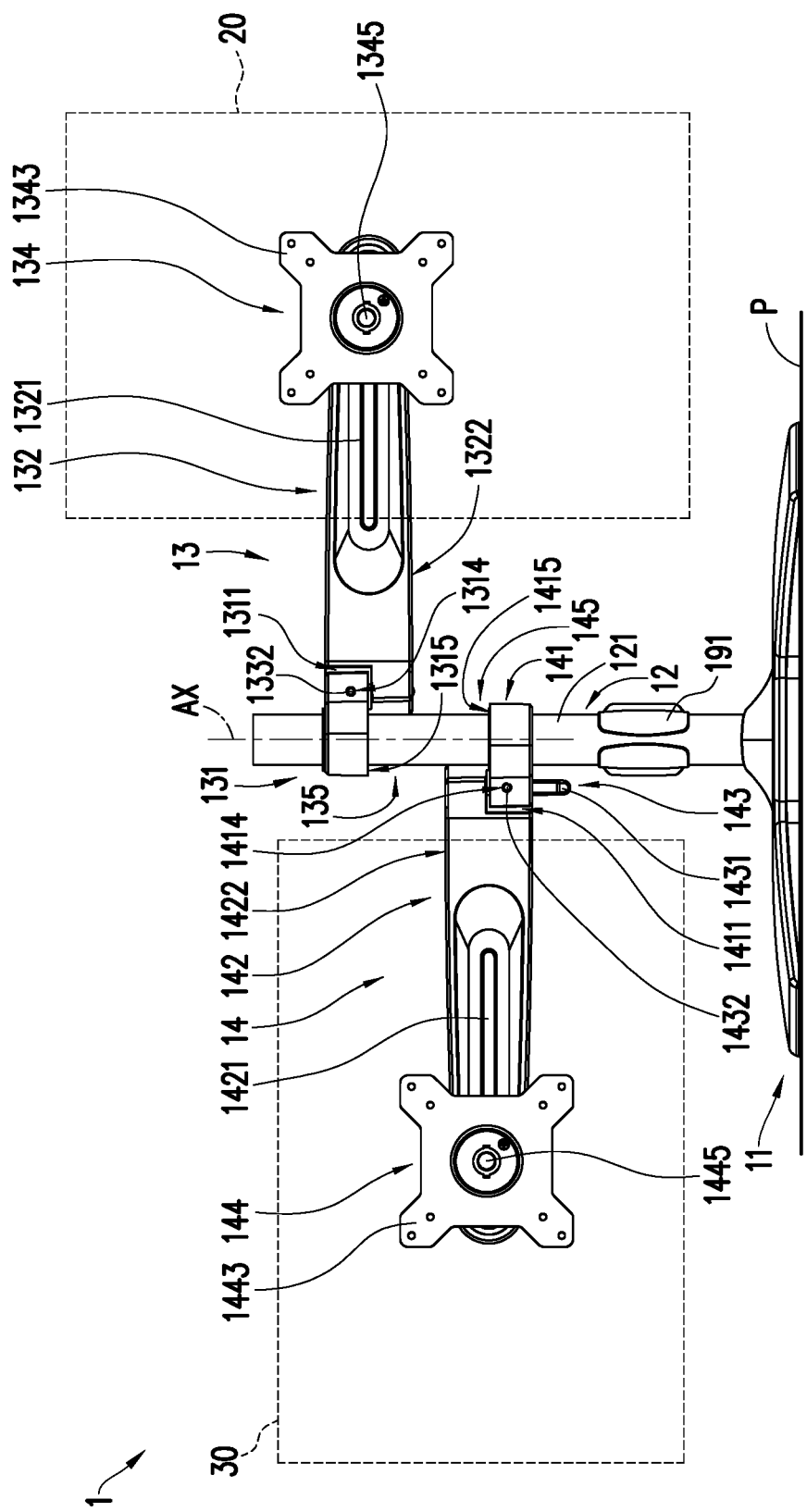
FIG. 10 is a schematic view after a second supporting arm of FIG. 9 slides along a central axis and the first display is rotated.

FIG. 10 is a schematic view after a second supporting arm of FIG. 9 slides along a central axis and the first display is rotated. Referring to FIGS. 3, 9, and 10, the extending direction of the slot 153 is parallel to the central axis AX, so that the first tenon 154 and the second tenon 155 are vertically slidable along the central axis AX. The second supporting arm 14 may slide toward the base 11 along the central axis AX, as shown in FIG. 10, so as to lower the height of the second display 30. In addition, the first fixing plate 1343 may be rotated to arrange the long side of the first display 20 vertically. In the state shown in FIG. 10, the bottom of the first display 20 and the bottom of the second display 30 may be aligned to each other.

Figure 11:
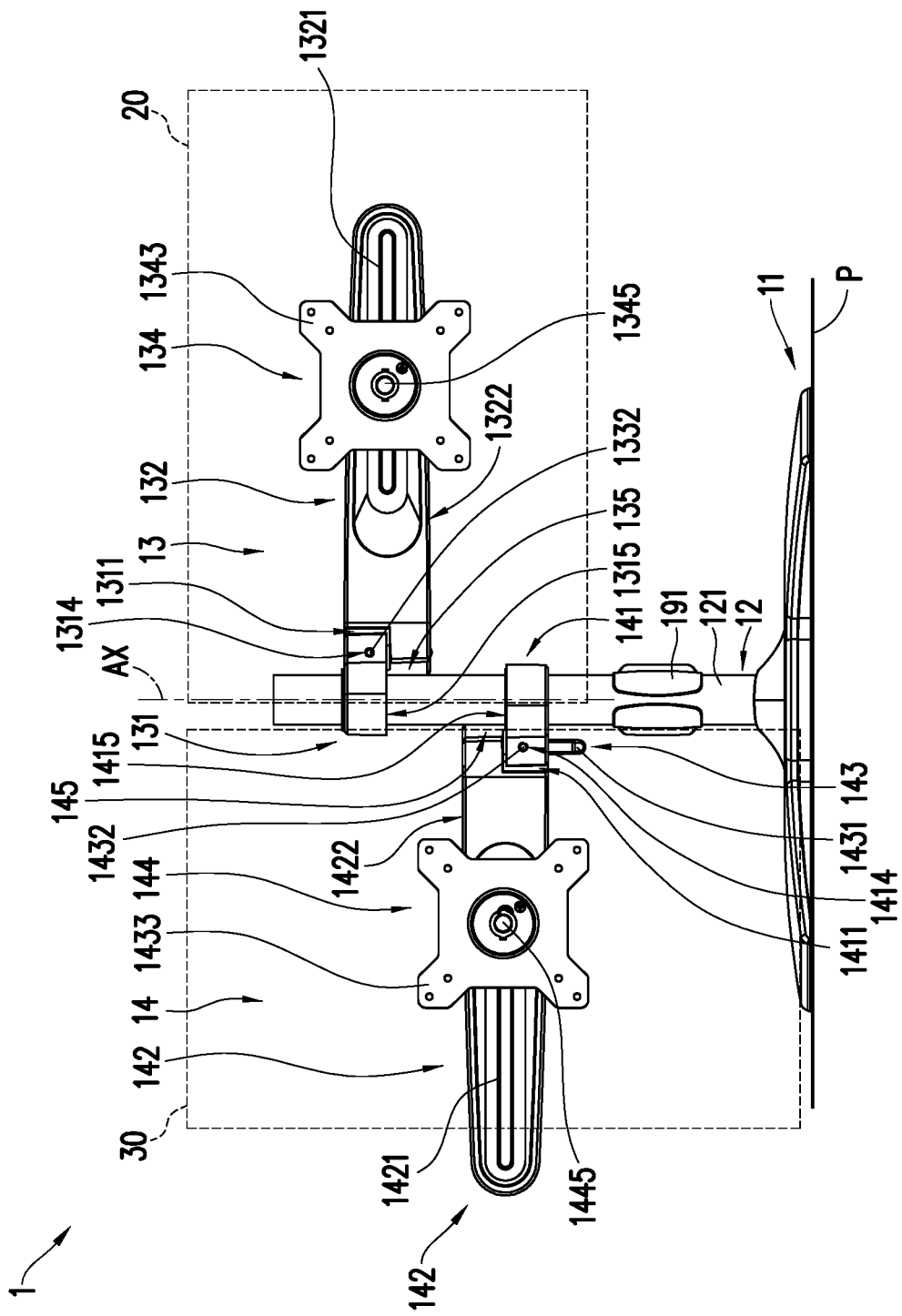
FIG. 11 is a schematic view after the second supporting arm and a second hinge of FIG. 9 slide and the second display is rotated.

FIG. 11 is a schematic view after the second supporting arm and a second hinge of FIG. 9 slide and the second display is rotated. Referring to FIGS. 3, 10, and 11, after the second supporting arm 14 slides toward the base 11 along the radial direction AD, the first hinge 134 may slide toward the standing rod 12 in the first perforated groove 1321, and the first fixing plate 1343 may be rotated to arrange the long side of the first display 20 horizontally. The second hinge 144 may slide toward the standing rod 12 in the second perforated groove 1421, and the second fixing plate 1443 may be rotated to arrange the long side of the second display 30 vertically. In the state shown in FIG. 11, the top of the first display 20 and the top of the second display 30 may be aligned to each other.

In addition, FIGS. 9 to 11 schematically show three different usage states of the multi-display stand 1. The user may adjust the multi-display stand 1 to the states not shown in FIGS. 9 to 11 according to his/her needs.

For example, the first supporting arm 13 and the second supporting arm 14 may be vertically moved along the central axis AX to be adjusted to arbitrary positions on the standing rod 12, and the first supporting arm 13 and the second supporting arm 14 may be horizontally pivotally rotated along the radial direction AD to arbitrary positions on the standing rod 12. The first hinge 134 may horizontally slide to an arbitrary position on the first perforated groove 1321, and the second hinge 144 may horizontally slide to an arbitrary position on the second perforated groove 1421. The first fixing plate 1343 may be rotated to an arbitrary position on the first body 1341, and the second fixing plate 1443 may be rotated to an arbitrary position on the second body 1441.

Accordingly, the user may adjust the positions and the angles of the first display 20 and the second display 30 based on his/her needs, so the multi-display stand 1 of the embodiment is convenient to use.

Figure 12:
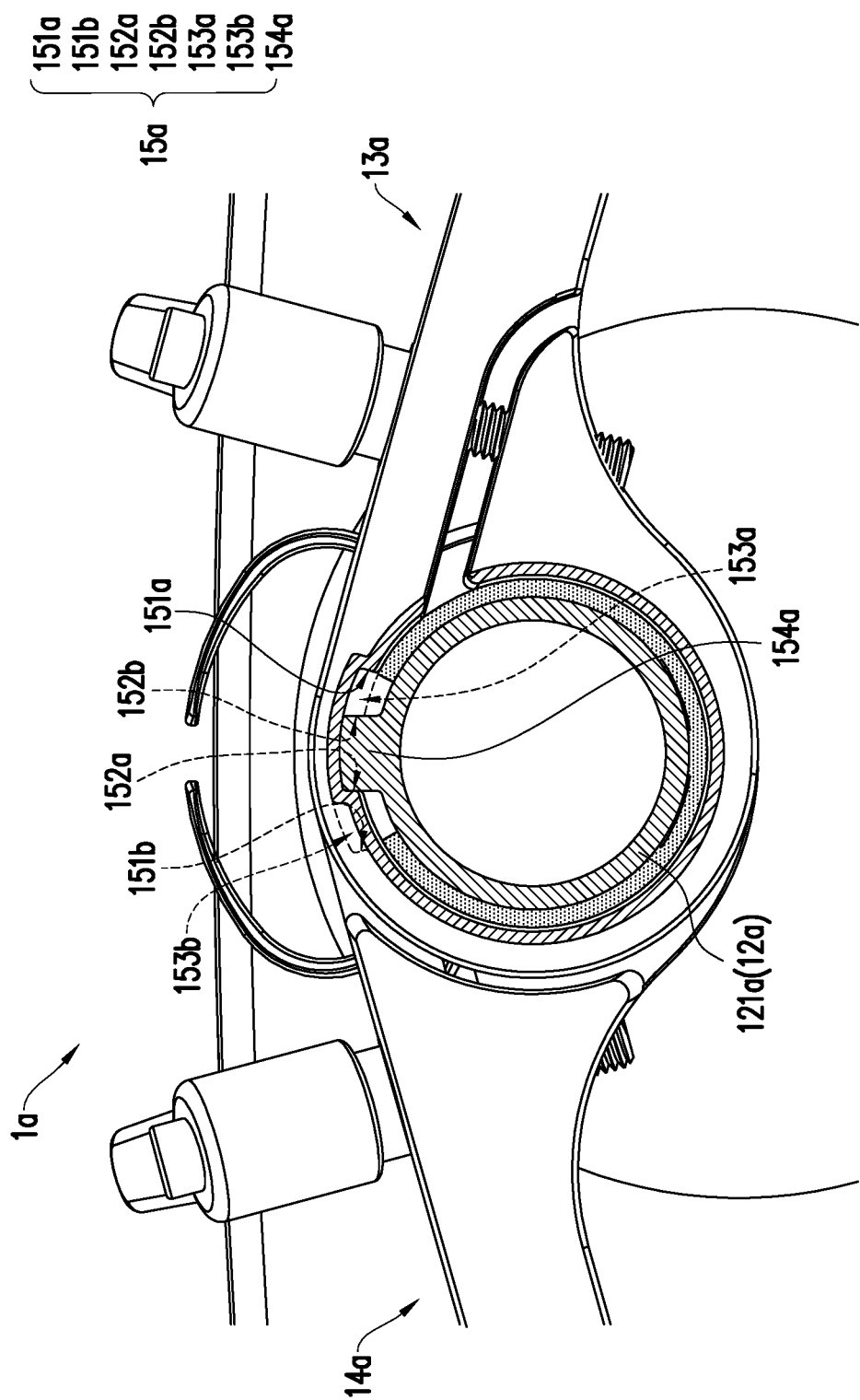
FIG. 12 is a schematic view of a multi-display stand according to another embodiment of the invention.

FIG. 12 is a schematic view of a multi-display stand according to another embodiment of the invention. Referring to FIG. 12, a multi-display stand 1a of the embodiment differs from the multi-display stand 1 of the above embodiment in that the positions at which the tenons and the slots (the first position-limiting wall and the second position-limiting wall) are switched. In other words, a position-limiting member 15a includes two first position-limiting walls 151a and 151b, two second position-limiting walls 152a and 152b, two slots 153a and 153b, and a tenon 154a. The tenon 154a of the embodiment is disposed on a rod body 121a of a standing rod 12a. The first position-limiting wall 151a, the second position-limiting wall 152a, and the slot 153a defined by the first position-limiting wall 151a and the second position-limiting wall 152a together are disposed on the first supporting arm 13a. The first position-limiting wall 151b, the second position-limiting wall 152b, and the slot 153b defined by the first position-limiting wall 151b and the second position-limiting wall 152b together are disposed on the second supporting arm 14a. The tenon 154a is partly accommodated in the slot 153a as well as the slot 153b, so as to render the same effect as the first embodiment.

In view of the foregoing, in the multi-display stand according to the embodiments of the invention, the supporting arms are movably sleeved to the standing rod along the central axis and the radial direction, and are configured to support the displays. The standing rod has two position-limiting walls and the supporting arms respectively have tenons, or the standing rod has a tenon and the supporting arms respectively have two position-limiting walls. The slot is defined between the two position-limiting walls, and the tenon is partly accommodated in the slot and movable along the central axis and the radial direction. Accordingly, the angles at which the user rotates the supporting arms can be effectively limited to prevent the multi-display stand from being out of balance and toppling over. Besides, the angles of the displays can be adjusted along the radial direction, and the positions of the displays can be adjusted along the central axis. Therefore, the multi-display stand is convenient to use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-display stand, configured to support a plurality of displays, the multi-display stand comprising:
    a standing rod, extending along a central axis;
    a plurality of supporting arms, disposed on the standing rod, wherein each of the supporting arms is configured to support one of the displays; and
    a position-limiting member, disposed between the standing rod and each of the supporting arms and comprising at least one first position-limiting wall, at least one second position-limiting wall, and at least one tenon,
    wherein each of the supporting arms is radially rotatable about the central axis with respect to the standing rod between a first position and a second position, and when the supporting arm is at the first position, the tenon abuts against the first position-limiting wall, and when the supporting arm is at the second position, the tenon abuts against the second position-limiting wall,
    wherein a first reference line connecting between a first point on the first position-limiting wall and a reference point on the central axis and a second reference line connecting between a second point on the second position-limiting wall and the reference point on the central axis define a first angle in a radial direction with respect to the central axis, a third reference line connecting between a third point on the tenon and the reference point on the central axis and a fourth reference line connecting between a fourth point on the tenon and the reference point on the central axis define a second angle in the radial direction with respect to the central axis, the third point contacts the first point while the supporting arm is at the first position and the fourth point contacts the second point while the supporting arm is at the second position, and a maximum operation angle range for rotation of each of the supporting arms along the radial direction between the first position and the second position is a difference between a value of the first angle and a value of the second angle,
    wherein each of the supporting arms comprises a surrounding body, the surrounding body is substantially tube-like and has a gap to form a C-shaped cross-section,
    wherein the standing rod further comprises a rod body and a plurality of hollow bushings, the hollow bushings are sleeved on the rod body, each of the surrounding bodies is sleeved on one of the hollow bushings correspondingly, and each of the hollow bushings has a cutout for the tenon to pass through, thereby forming the C-shaped cross-section.

2. The multi-display stand as claimed in claim 1, wherein the corresponding first position-limiting wall and second position-limiting wall define a slot, the slot is in communication with the cutout, and the tenon passes through the cutout and is partly accommodated in the slot.

3. The multi-display stand as claimed in claim 2, wherein the slot and the cutout extend parallelly relative to the central axis.

4. The multi-display stand as claimed in claim 3, wherein each of the supporting arms further comprises a clamping member passing through the surrounding body, and the clamping member adjusts sizes of the gap and the cutout to modify an extent of clamping of the surrounding body and the hollow bushing with respect to the standing rod.

5. The multi-display stand as claimed in claim 4, wherein each of the supporting arms comprises an arm body and a hinge, the arm body is connected to the surrounding body and extends outward, and the hinge is disposed on the arm body and provided for mounting the display.

6. The multi-display stand as claimed in claim 4, wherein the maximum operation angle is between 20° and 40°.

7. The multi-display stand as claimed in claim 4, further comprising a base, and the standing rod is disposed on the base.

8. The multi-display stand as claimed in claim 1, wherein the first position-limiting wall and the second position-limiting wall are disposed on the standing rod, and the tenon is disposed on the supporting arm.

9. The multi-display stand as claimed in claim 1, wherein the tenon is disposed on the standing rod, and the first position-limiting wall and the second position-limiting wall are disposed on the supporting arm.

10. The multi-display stand as claimed in claim 1, wherein the number of the supporting arms is two, the surrounding body of one of the supporting arms and the surrounding body of the other of the supporting arms are in complementary shapes, the first position-limiting wall and the second position-limiting wall are disposed on the standing rod, and the tenon is disposed on an inner surface of the surrounding body.

11. The multi-display stand as claimed in claim 10, wherein one of the supporting arms has a first surrounding body that surrounds and is fastened releasably on the standing rod, and that has a lower surface, and a first arm body that extends horizontally from the first surrounding body, that is adapted for supporting a first display thereon, and that has a lower surface, the lower surface of the first arm body being lower than the lower surface of the first surrounding body and cooperating with the lower surface of the first surrounding body to define a first vertical surface therebetween, the first vertical surface cooperating with the lower surface of the first surrounding body to define a first space therebetween; another of the supporting arms has a second surrounding body that surrounds and is fastened releasably on the standing rod, and that has an upper surface, and a second arm body that extends horizontally from the second surrounding body, that is adapted for supporting a second display thereon, and that has an upper surface, the upper surface of the second arm body being higher than the upper surface of the second surrounding body and cooperating with the upper surface of the second surrounding body to define a second vertical surface therebetween, the second vertical surface cooperating with the upper surface of the second surrounding body to define a second space therebetween; wherein, when the first surrounding body of the first supporting arm engages the second space of the second supporting arm and the second surrounding body of the second supporting arm abuts against the first surrounding body of the first supporting arm, the second surrounding body of the second supporting arm engages the first space of the first supporting arm.

12. The multi-display stand as claimed in claim 11, wherein the first vertical surface has a height equal to that of the second surrounding body, and the second vertical surface has a height equal to that of the first surrounding body.

13. The multi-display stand as claimed in claim 1, wherein the number of the supporting arms is two, the surrounding body of one of the supporting arms and the surrounding body of the other of the supporting arms are in complementary shapes, the tenon is disposed on the standing rod, and the first position-limiting wall and the second position-limiting wall are disposed on an inner surface of the surrounding body.

14. The multi-display stand as claimed in claim 13, wherein one of the supporting arms has a first surrounding body that surrounds and is fastened releasably on the standing rod, and that has a lower surface, and a first arm body that extends horizontally from the first surrounding body, that is adapted for supporting a first display thereon, and that has a lower surface, the lower surface of the first arm body being lower than the lower surface of the first surrounding body and cooperating with the lower surface of the first surrounding body to define a first vertical surface therebetween, the first vertical surface cooperating with the lower surface of the first surrounding body to define a first space therebetween; another of the supporting arms has a second surrounding body that surrounds and is fastened releasably on the standing rod, and that has an upper surface, and a second arm body that extends horizontally from the second surrounding body, that is adapted for supporting a second display thereon, and that has an upper surface, the upper surface of the second arm body being higher than the upper surface of the second surrounding body and cooperating with the upper surface of the second surrounding body to define a second vertical surface therebetween, the second vertical surface cooperating with the upper surface of the second surrounding body to define a second space therebetween; wherein, when the first surrounding body of the first supporting arm engages the second space of the second supporting arm and the second surrounding body of the second supporting arm abuts against the first surrounding body of the first supporting arm, the second surrounding body of the second supporting arm engages the first space of the first supporting arm.

15. The multi-display stand as claimed in claim 14, wherein the first vertical surface has a height equal to that of the second surrounding body, and the second vertical surface has a height equal to that of the first surrounding body.

* * * * *